United States Patent
Nentwig

(10) Patent No.: US 9,191,987 B2
(45) Date of Patent: Nov. 17, 2015

(54) DETERMINING "FAIR SHARE" OF RADIO RESOURCES IN RADIO ACCESS SYSTEM WITH CONTENTION-BASED SPECTRUM SHARING

(75) Inventor: Markus Nentwig, Helsinki (FI)

(73) Assignee: Nokia Technologies OY, Espoo (FI)

( * ) Notice: Subject to any disclaimer, the term of this patent is extended or adjusted under 35 U.S.C. 154(b) by 265 days.

(21) Appl. No.: 13/511,773

(22) PCT Filed: Nov. 25, 2009

(86) PCT No.: PCT/IB2009/055342
§ 371 (c)(1),
(2), (4) Date: Jul. 31, 2012

(87) PCT Pub. No.: WO2011/064617
PCT Pub. Date: Jun. 3, 2011

(65) Prior Publication Data
US 2012/0287879 A1 Nov. 15, 2012

(51) Int. Cl.
*H04W 4/00* (2009.01)
*H04W 76/06* (2009.01)
*H04W 72/04* (2009.01)

(52) U.S. Cl.
CPC ........ *H04W 76/066* (2013.01); *H04W 72/0406* (2013.01)

(58) Field of Classification Search
USPC .................................. 370/230, 320, 329, 337
See application file for complete search history.

(56) References Cited

U.S. PATENT DOCUMENTS

| | | | |
|---|---|---|---|
| 6,580,725 B1 * | 6/2003 | Phillips et al. | 370/461 |
| 6,625,134 B1 * | 9/2003 | Ji et al. | 370/331 |
| 8,014,782 B2 * | 9/2011 | Granzow et al. | 455/450 |
| 8,290,503 B2 * | 10/2012 | Sadek et al. | 455/452.1 |
| 8,918,114 B2 * | 12/2014 | Gupta et al. | 455/452.2 |
| 2003/0037146 A1 * | 2/2003 | O'Neill | 709/226 |
| 2003/0214914 A1 * | 11/2003 | Cain | 370/252 |

(Continued)

FOREIGN PATENT DOCUMENTS

WO 2007/051140 A2 5/2007
WO 2009/128842 A1 10/2009

OTHER PUBLICATIONS

International Search Report mailed Mar. 8, 2010 in International Application Serial No. PCT/IB2009/055342, 8 pp.

*Primary Examiner* — Gregory Sefcheck
*Assistant Examiner* — Jael Ulysse
(74) *Attorney, Agent, or Firm* — Locke Lord LLP

(57) ABSTRACT

A method, apparatus, system, and computer program product example embodiments of the invention are disclosed to structure access to a wireless medium to reduce interference between nearby nodes. In example embodiments of the invention, a method includes the steps of determining an amount of available wireless communication resources in a reception area; determining a number of wireless communication nodes in the reception area; generating a reservation limit of the available wireless resources; determining an inability to allocate the reservation limit of the available wireless resources; transmitting a request for release of resources to at least one other wireless communication node. Another node receiving the request, performs a method including the steps of determining a threshold; comparing an allocated amount of wireless communication resources against the threshold; and releasing at least a part of the allocated amount of resources, if the reserved number is greater than the threshold.

19 Claims, 11 Drawing Sheets

(56) References Cited

U.S. PATENT DOCUMENTS

| | | |
|---|---|---|
| 2004/0058695 A1* | 3/2004 | Ji et al. .......................... 455/500 |
| 2007/0104215 A1* | 5/2007 | Wang et al. ................... 370/458 |
| 2007/0115817 A1* | 5/2007 | Gupta et al. .................. 370/230 |
| 2007/0153717 A1* | 7/2007 | Tervonen et al. ............. 370/320 |
| 2007/0189298 A1* | 8/2007 | Wong et al. ................ 370/395.1 |
| 2007/0223419 A1* | 9/2007 | Ji et al. .......................... 370/329 |
| 2007/0263654 A1 | 11/2007 | Salokannel et al. |
| 2007/0266244 A1* | 11/2007 | Walker et al. ................. 713/168 |
| 2008/0076432 A1* | 3/2008 | Senarath et al. ............. 455/442 |
| 2008/0123585 A1* | 5/2008 | Granzow et al. .............. 370/320 |
| 2008/0137620 A1* | 6/2008 | Wang et al. .................... 370/337 |
| 2009/0046641 A1* | 2/2009 | Wang et al. .................... 370/329 |
| 2009/0196180 A1* | 8/2009 | Bahl et al. ...................... 370/235 |
| 2009/0225712 A1* | 9/2009 | Stamoulis et al. ............. 370/329 |
| 2009/0228598 A1* | 9/2009 | Stamoulis et al. ............. 709/230 |
| 2009/0252200 A1* | 10/2009 | Dohler et al. .................. 375/141 |
| 2010/0008230 A1* | 1/2010 | Khandekar et al. ............ 370/237 |
| 2010/0173586 A1* | 7/2010 | McHenry et al. ................ 455/62 |
| 2010/0189048 A1* | 7/2010 | Baker et al. .................... 370/329 |
| 2010/0195585 A1* | 8/2010 | Horn et al. ...................... 370/329 |
| 2011/0013572 A1* | 1/2011 | Huang et al. ................... 370/329 |
| 2012/0230195 A1* | 9/2012 | Khivesara et al. ............. 370/235 |

* cited by examiner

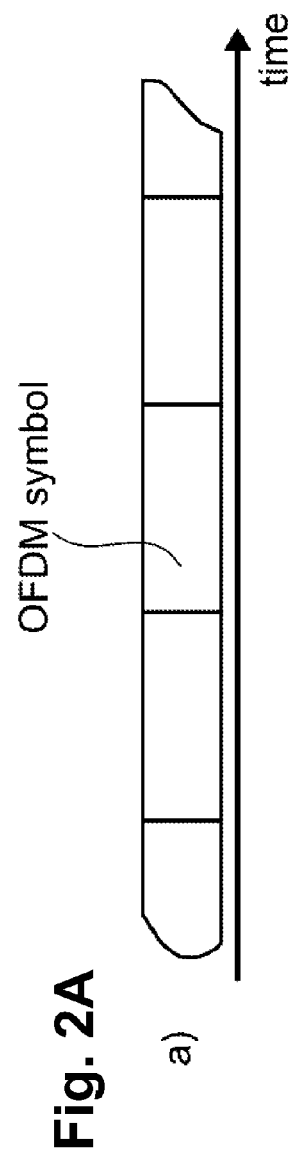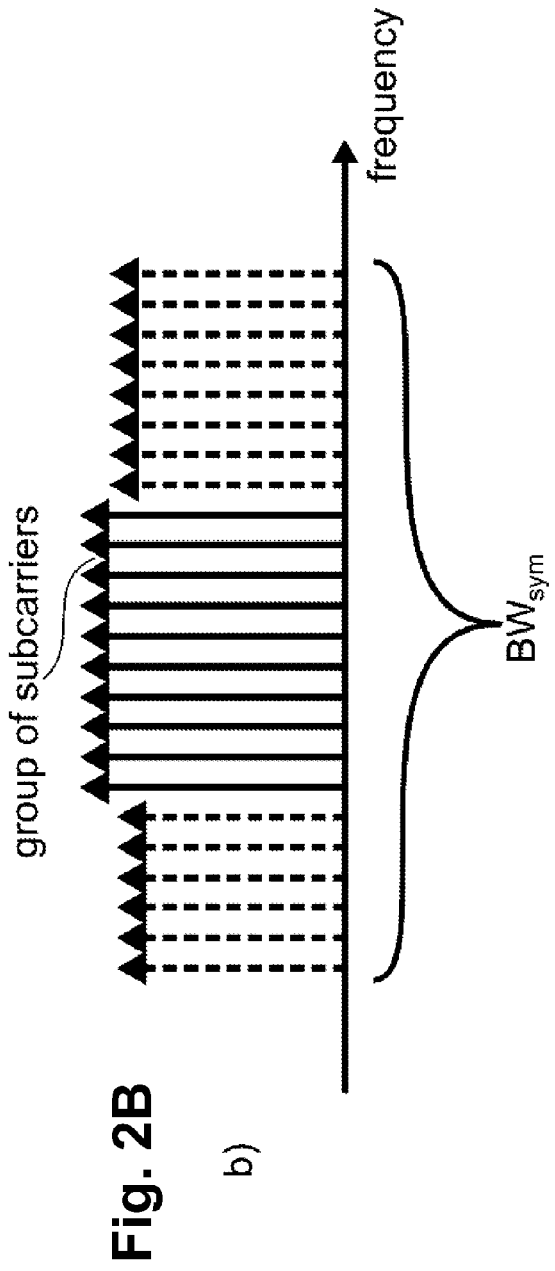

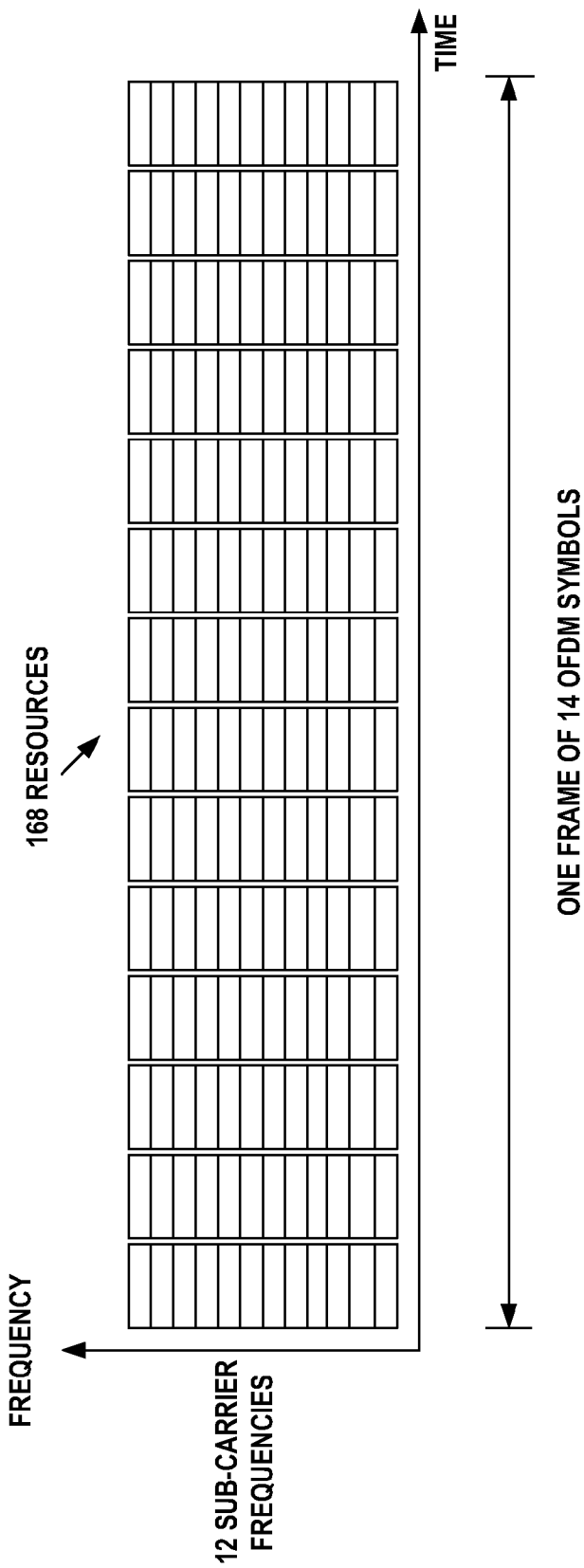

Fig. 6B

| Octets: | Octets: | | | |
|---|---|---|---|---|
| MAC FRAME TYPE= MANAGEMENT | RELEASE MESSAGE | SOURCE ADDRESS =A1 (NODE 0) | DESTINATION ADDRESS = BCST | EARLIER MSG = 620 |
| 631 | 632 | 633 | 634 | 635 |

RELEASE MESSAGE 630

DETERMINING "FAIR SHARE" OF RADIO RESOURCES IN RADIO ACCESS SYSTEM WITH CONTENTION-BASED SPECTRUM SHARING

FIELD

The technical field relates to wireless communications. More particularly, the technical field relates to techniques for structuring access to the wireless medium to reduce interference between nearby nodes.

BACKGROUND

A future wireless system is expected to provide local-area coverage to selected areas, such as offices and homes, where high bit-rates are provided in small cells through inexpensive network infrastructure. Local-area coverage supplements cellular networks, moving traffic away from the expensive cellular network infrastructure to inexpensive local area networks that may use inexpensive internet connections, such as wireless routers, as backbone.

For example, local-area cells may replace wired Ethernet connections between office personal computers (PCs), similar to a wireless local area network (WLAN) with a large number of low-power indoor access points (APs). Each AP covers a relatively small area and serves a small number of users, allowing a high bit-rate per user. Local-area cells may preserve key features of a cellular network, such as reliability, authentication, and excellent mobility.

Conventional network planning to prevent interference between areas served by nearby access points is impractical for a large number of local-area cells. Instead, local-area cells should self-organize use of shared radio resources with minimal operator intervention. However, in a crowded radio environment it becomes increasingly difficult to allocate a sufficient number of resources in a manner that does not conflict with resource allocations by neighboring nodes.

A situation may arise, where a node becomes unable to allocate a sufficient number of resources, while one or more neighboring nodes hold a disproportionally large number of resources occupied.

The difficulty of allocating a new resource increases with the number of neighboring nodes, the number of resources they hold allocated, the geographical layout of a neighborhood of nodes and other factors.

If resource allocation in neighboring nodes is not limited to a fair share of resources, the outcome may be highly unfair. Some mobile devices may gain a strong advantage or suffer a disadvantage compared to others, depending on their path loss between a mobile device and an access point. The successful device with a good quality link may dominate use of the resource, while other devices suffering high path loss or long links may have little or no access to the resource.

SUMMARY

A method, apparatus, system, and computer program product example embodiments of the invention are disclosed to structure access to a wireless medium between nearby nodes.

In example embodiments of the invention, a method includes the steps of determining an amount of available wireless communication resources in a reception area; determining a number of wireless communication nodes in the reception area; generating a reservation limit of the available wireless communication resources; determining an inability to allocate the reservation limit of the available wireless communication resources; transmitting a request for release of resources to at least one other wireless communication node.

In example embodiments of the invention, the method steps continue by attempting to allocate available wireless communication resources.

In example embodiments of the invention, the method steps include signaling an indication of the reservation limit to at least one other wireless communication node.

In example embodiments of the invention, the method steps include signaling an indication of preferred resources to at least one other wireless communication node.

In example embodiments of the invention, the method steps include determining a number of competing wireless communication nodes.

In example embodiments of the invention, the method steps include detecting a transmission from at least one wireless communication node; determining an identity of the at least one wireless communication node based on the detected transmission; and determining a count of unique identities during a time window based on the identity of the at least one wireless communication node.

In example embodiments of the invention, a method includes the steps of allocating an amount of available wireless communication resources; receiving a request from a wireless communication node to release wireless communication resources; determining a threshold; comparing the allocated amount of wireless communication resources against the threshold; and releasing at least a part of the allocated amount of wireless communication resources, if the reserved number is greater than the threshold.

In example embodiments of the invention, the method steps include receiving an indication of a reservation limit and determining the threshold based on the received indication of a reservation limit.

In example embodiments of the invention, the method steps include attempting to re-allocate additional wireless communication resources on reception of a release message or an expiration of a timer.

In example embodiments of the invention, the method includes said available wireless communication resources being drawn from the group consisting of an available number of TDMA time slots, an available number of different FDMA frequency bands, an available number of different OFDMA time slots in the different sub-carrier frequencies, and an available number of different CDMA orthogonal codes.

In example embodiments of the invention, an apparatus includes at least one processor, at least one memory including computer program code, the at least one memory and the computer program code configured to, with the at least one processor, cause the apparatus at least to:

determine an amount of available wireless communication resources in a reception area;

determine a number of wireless communication nodes in the reception area;

generate a reservation limit of the available wireless communication resources;

determine an inability to allocate the reservation limit of the available wireless communication resources;

transmit a request for release of resources to at least one other wireless communication node.

In example embodiments of the invention, an apparatus includes at least one processor, at least one memory including computer program code, the at least one memory and the computer program code configured to, with the at least one processor, cause the apparatus at least to:

allocate an amount of available wireless communication resources;

receive a request from a wireless communication node to release wireless communication resources;

determine a threshold;

compare the allocated amount of wireless communication resources against the threshold; and release at least a part of the allocated amount of wireless communication resources, if the reserved number is greater than the threshold.

In example embodiments of the invention, a computer readable medium stores program instructions, which when executed by a computer processor, perform the steps of:

determining an amount of available wireless communication resources in a reception area;

determining a number of wireless communication nodes in the reception area;

generating a reservation limit of the available wireless communication resources;

determining an inability to allocate the reservation limit of the available wireless communication resources;

transmitting a request for release of resources to at least one other wireless communication node.

In example embodiments of the invention, a computer readable medium stores program instructions, which when executed by a computer processor, perform the steps of:

allocating an amount of available wireless communication resources;

receiving a request from a wireless communication node to release wireless communication resources;

determining a threshold;

comparing the allocated amount of wireless communication resources against the threshold; and releasing at least a part of the allocated amount of wireless communication resources, if the reserved number is greater than the threshold.

DESCRIPTION OF THE FIGURES

FIG. 2A shows an example stream of orthogonal frequency division multiplex (OFDM) symbols on a time axis.

FIG. 2B shows an example for a group of subcarriers within a symbol, which defines a "radio resource" that can be allocated to a single transmitting node.

FIG. 3 illustrates an example of 14 OFDM symbols that form a frame, containing 12 separate subcarrier groups.

FIG. 6B depicts an example release message as a management MAC frame sent by the requesting apparatus as a broadcast to all other neighboring nodes.

DISCUSSION OF EXAMPLE EMBODIMENTS OF THE INVENTION

Figure 1:
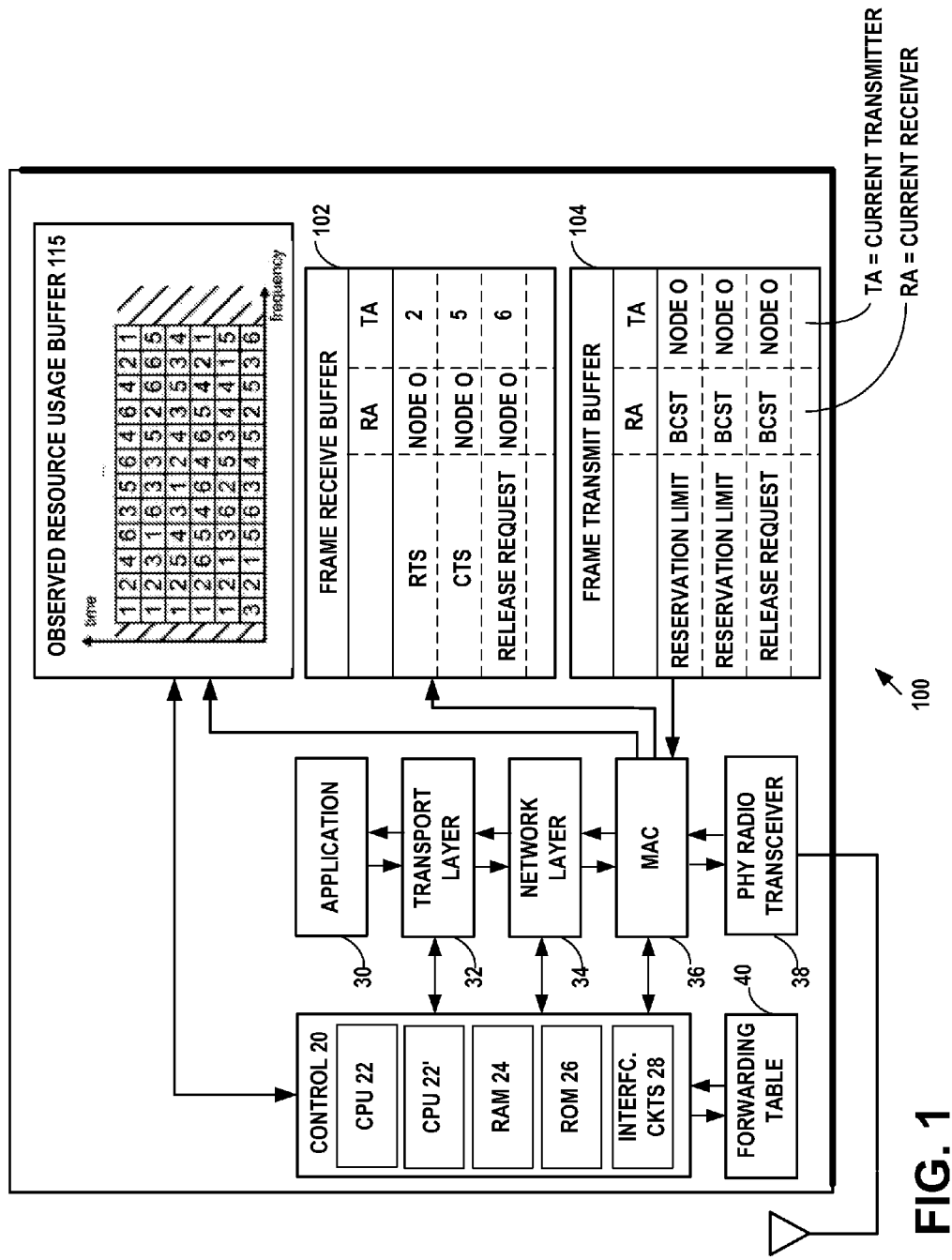
FIG. 1 illustrates an example embodiment of a wireless apparatus.

A method, apparatus, system, and computer program product example embodiments of the invention are disclosed to structure access to a wireless medium to improve hotspot coverage. These are typically environments that offload traffic from cellular networks, where there may be a large number of low-power indoor access points (APs), each covering a relatively small area and serving a small number of users, allowing high-bit-rates per user. Typically, there is no careful network planning, as in macrocellular systems. Instead, nodes autonomously negotiate access to the shared radio channel. Example embodiments of the invention relate to the negotiation of access to a shared wireless medium between wireless nodes.

In example embodiments of the invention, a network node determines an amount of available wireless communication resources in a reception area. A node may be an access point (AP) or it may be a mobile device, also referred to as user equipment (UE), in cellular context. This may include both truly mobile wireless devices such as personal digital assistants (PDAs) and laptop computers, and also user equipment (UE) devices such as a desktop personal computer, home-entertainment equipment, a surveillance camera, a digital cash register, and the like. In a typical network, an access point may be surrounded by an arbitrary number of such user equipment (UEs) devices. A typical network topology is the star topology of one-to-many links, where one access point serves as a central hub for many user equipment (UEs) devices, forming a network. Nodes within the network may have existing control channels. For example, an access point may not need to compete with connected UEs for wireless resources, since signaling for resource allocation may more efficiently take place on an existing control channel. Example wireless personal area networks (WPANs) of interconnected devices within a relatively small area, include for example, Bluetooth and ZigBee networks. Example wireless local area networks (WLANs) of interconnected devices over an intermediate-size area such as a home, office, or school, include for example the IEEE 802.11, DECT, and HiperLAN networks.

Nodes may operate as so-called "secondary" devices using a frequency band that is shared with "primary" devices. Primary devices may have higher priorities than secondary devices. For example, the IEEE 802.11e MAC standard specifies four different access categories, namely voice, video, background, and best-effort, in order of decreasing priority. Primary devices are those that are transmitting voice or video packets, whereas secondary devices are those that are transmitting background or best-effort packets. Secondary devices may be required to defer their transmission, when the presence of primary devices is detected, to prevent causing intolerable interference to the operation of primary devices. Examples for primary devices are digital TV stations, digital radio stations, wireless digital microphones, ground stations for digital satellite links and cellular radio equipment that require critical timing in the periodic transmission of packets. A radio resource in a frequency band shared with primary devices may become an available radio resource, when no presence of primary devices is detected. The availability of a radio resource may be governed by other factors, for example licensing of frequency bands to radio network operators.

Interference may result when more than one node in a neighborhood attempts to access a wireless communication resource. Two nodes are neighboring nodes, if a radio path loss between the nodes is below a path loss threshold value. The path loss or path attenuation is the reduction in power density of the signal as it propagates through space. It may be estimated for example by determining a received signal strength of a beacon transmissions, or a message such as request to send (RTS) or clear to send (CTS).

Two neighboring nodes may be competing nodes, if they have no other means of coordinating access to shared radio resources. For example, consider two UEs that are served by the same AP. The AP may include a scheduler that coordinates shared medium access between the two UEs. Thus, for this example, the UEs may be neighboring nodes, but not competing nodes.

Resource sharing may be further constrained by another node within the network, such as an access point, scheduling node, coordinating node, support node or the like.

Examples of access methods of wireless communication media include time domain multiple access (TDMA), frequency domain multiple access (FDMA), orthogonal frequency division multiple access (OFDMA), and code division multiple access (CDMA).

The wireless communication resource in TDMA is the available number of time slots. In TDMA, several users may share the same carrier frequency of a wireless medium by dividing the carrier signal into different time slots, and the wireless communication resource is available number of time slots.

The wireless communication resource in FDMA is the available number of different frequency bands. In FDMA, users may simultaneously transmit different data streams over different frequency bands to different users or nodes, and the wireless communication resource is available number of different frequency bands.

The wireless communication resource in OFDMA is the available number of different time slots in the different sub-carrier frequencies. OFDMA may be considered a combination of FDMA and TDMA, where there are different sub-carrier frequencies chosen so that the sub-carriers are orthogonal to each other and cross-talk between the sub-carriers is eliminated. Several users may share the same sub-carrier frequency by dividing the sub-carrier signal into different time slots. The wireless communication resource is the available number of different time slots in the different sub-carrier frequencies.

The wireless communication resource in CDMA is the available number of different orthogonal codes. Each user in synchronous CDMA uses a code orthogonal to the other users' codes to modulate their signal to allow multiple users to be multiplexed over the same the same carrier frequency, and the wireless communication resource is available number of different orthogonal codes.

Each of the access methods, for example TDMA, FDMA, OFDMA, and CDMA, may limit access to a radio resource by competing nodes to prevent interference. For example, a node may be forbidden to allocate a radio resource that is currently reserved by a competing node.

The sharing of resources may be governed by predetermined rules that must be obeyed by every node. Rules may be chosen according to the particular needs of a radio system, such as efficiency, signaling complexity, and power consumption of radio transmitters. For example, the following rules may apply to every node in a radio system:

Rule 1: A node may only transmit on a radio resource, when the node holds a reservation of type "A" on the radio resource.

Rule 2: A node may only obtain a reservation of type "A" on a radio resource, when no competing node holds a reservation of type "B" on the radio resource.

Rule 3: A node may only obtain a reservation of type "B" on a radio resource, when no competing node holds a reservation of type "A" on the radio resource.

A transmitting node may obtain a reservation of type "A" on a radio resource, enabling transmission. A non-competing receiving node, planning to receive data from the transmitting node, obtains a reservation of type "B" on the same radio resource. The reservation of type "B" may prevent interfering transmissions from competing nodes in the vicinity of B. Transmitting and receiving nodes may coordinate their activities through an existing control link. The control link may use a different radio resource. The transmitting node transmits data packets on the radio resource to the receiving node. This example further illustrates that it may be necessary to acquire reservations on one particular radio resource for the nodes at both ends of a data link.

In a neighborhood of nodes with a fixed number of available radio resources, only a limited number of resources may be allocated by each node without violating the rules and/or causing intolerable interference to other nodes. Within a neighborhood of nodes, there exists a limit to the number of resources that may be allocated simultaneously by every node. The limit may be referred to as fair share.

A node allocating more than the fair share of resources may prevent a nearby node from allocating its fair share. Such a situation may be considered "unfair".

Depending on the topology of the network, a node may be able to allocate more than the fair share without preventing nearby nodes from allocating the fair share. This situation is desirable, improves the performance of the radio system and does not cause unfairness.

A node that allocates more than the fair share of resources may be called a "rich" node, and a node that is unable to allocate the fair share a "poor" node.

In general it is not possible to determine the fair share without complete knowledge of all radio nodes in the environment. Further, it is not desirable to define a single fair share for the whole extent of a radio environment, because such an inflexible application of the concept would invariably lower the performance of all nodes in the environment down to the level of the worst performing node. Instead, a local approximation to the fair share may be determined by an individual node, based on limited information on neighboring nodes. The local approximation to the fair share may be called a reservation limit. The reservation limit may be considered an example implementation of the fair share, and the discussion herein related to the fair share may apply partly or in full to the reservation limit.

Example embodiments of the invention recognize the disparity between a rich node having reserved many resources and a poor node that is unable to allocate a fair share of resources. The inability of the poor node may be caused by the need to reserve a matching set of resources with a third node. Example embodiments of the invention may prevent a rich node from obstructing a poor node in its attempts to reserve sufficient resources. Example embodiments of the invention may identify such a situation and trigger the release of resources from a rich node that has reserved more than its fair share. A node that finds it is not able to allocate its fair share, may transmit a request for the release of resources in a request message. The request message may be directed to a set of predetermined recipient nodes or the request message may be transmitted as a broadcast message. The request message indicates the inability of a node to allocate an amount of wireless communication resources corresponding to its reservation limit. Other nodes, termed "requested nodes", receive the request message. Each requested node may determine a threshold and compares its actual number of reserved resources against the threshold. The requested node releases a portion of its allocated wireless communication resources in response to the request, if the actual number is greater than the threshold, to enable the requesting node to reserve additional wireless communication resources. This happens simultaneously for all requested nodes receiving a request message. In this manner, resources may be un-reserved and the requesting node is then able to reserve more resources. After receiving a release message from the requesting node, or after expiry of a timer, the requested nodes are allowed to re-reserve as many resources as they can.

In example embodiments of the invention, a network node determines a number of competing wireless communication nodes. This determination may be performed by receiving channel reservation messages from nearby radio nodes, retrieving a field from each message that provides the identity of the node transmitting the message, and determining the number of unique identifiers. The information identifying the node may be time stamped to determine whether the node transmitting the message is still considered "active" at a later time, so that only unique identifiers (IDs) from recently received messages are counted. The length of the time window may be increased in high traffic conditions. The number of competing nodes may be determined by extracting node IDs from "channel reservation messages" of competing nodes, collecting the IDs in a data structure, and determining the number of competing nodes based on the number of elements in the data structure. A channel reservation message may indicate reservation of the channel by a device. A channel reservation message may implicitly indicate reservation of the channel by a device, for example by using the channel for data transmission. Examples of channel reservation messages include:

a beacon frame;
a probe frame;
a request-to-send message (RTS);
a clear-to-send message (CTS);
a data send message (DS);
a data message (DATA) and
an acknowledgement message (ACK).

An entry in the data structure with the identifier (ID) of a listed node may be removed after a predetermined period of no activity from the listed node.

In one embodiment, the sender of a message is identified as a competing node, if neither the ID of the sender nor the ID of the recipient match a predetermined ID of a known AP. This is because an AP typically coordinates the access of the shared medium by nodes communicating with the AP, and thus nodes connected to the AP do not compete among themselves.

In example embodiments of the invention, a reservation limit of the available wireless communication resources is generated for a wireless communication node based on the determined number of wireless communication nodes. The reservation limit may be calculated by dividing a determined number of available resources by the determined number of competing radio nodes. The calculation of the reservation limit may additionally be based on a number of simultaneous connections held by a node.

Figure 2C:
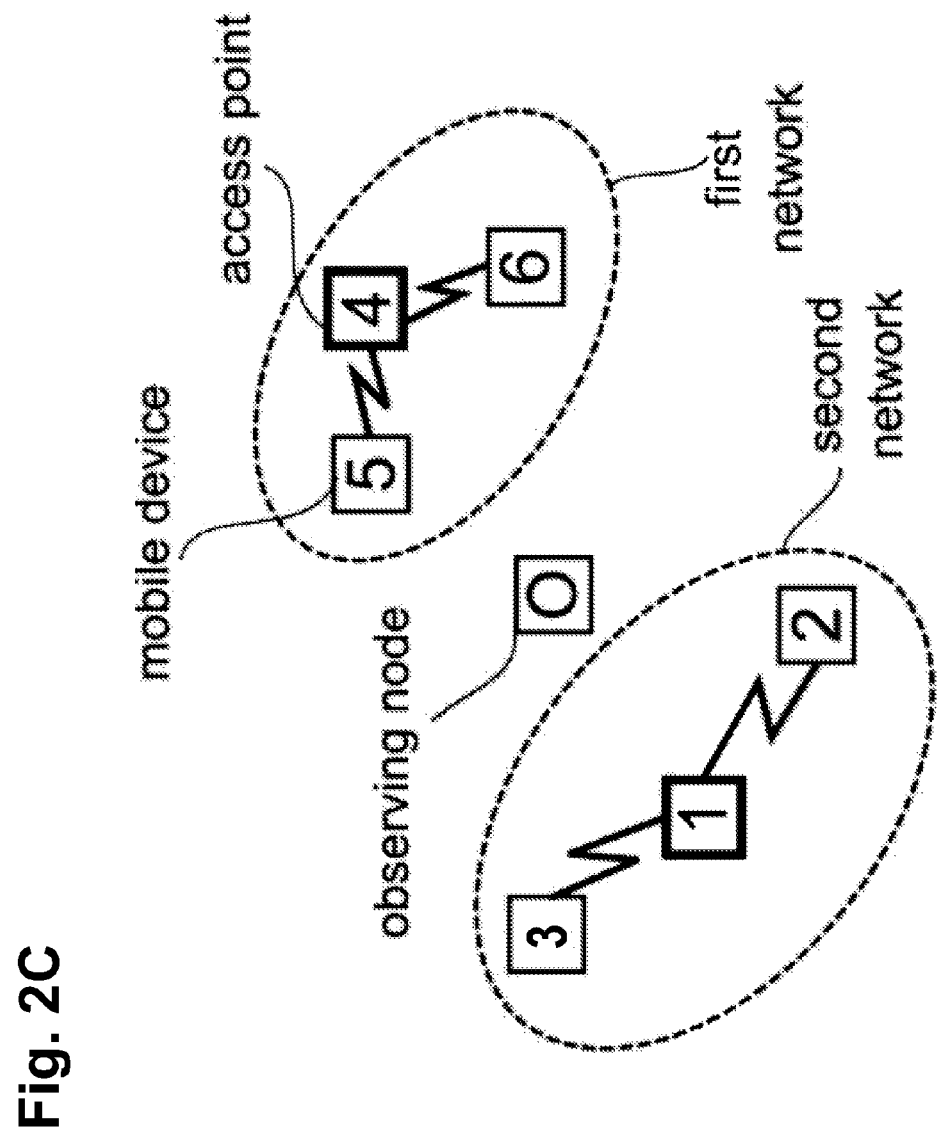
FIG. 2C illustrates an example embodiment of a network environment with seven wireless apparatuses.

FIG. 1 illustrates an example embodiment of an apparatus 100 in an example embodiment of a network environment shown in FIG. 2C. The apparatus 100 includes a control module 20 that includes a dual core central processing unit (CPU) 22 and 22', a random access memory (RAM) 24, a read only memory (ROM) or programmable read only memory (PROM) 26, and interface circuits 28 to interface with forwarding table 40, a key pad, display, optional microphone, speakers, ear pieces, and camera or other imaging devices, etc. The several devices 0, 1, 2, 3, 4, 5, and 6 shown in the network of FIG. 2C may each have substantially the same organization and components shown for the apparatus 100 of FIG. 1. The dual core CPU processors 22 and 22' are programmed with computer program instructions stored in the memory RAM 24 and ROM 26, to operate in conjunction with the media access control (MAC) 36 and the transceiver 38 to perform the operations of the example embodiments.

The frame receive buffer 102 is connected to the media access control (MAC) 36 to receive channel reservation messages from other devices 1, 2, 3, 4, 5, and 6, such as a beacon frame, a probe frame, a request-to-send message (RTS), a clear-to-send message (CTS), a data send message (DS), an acknowledgement message (ACK), a data message (DATA) or the like. The apparatus determines the number of wireless communication nodes in the reception area by receiving channel reservation messages from nearby radio nodes 1, 2, 3, 4, 5, and 6, retrieving an ID field from each message providing the identity of the node transmitting the message, and buffering the ID values as a data structure in the observed usage resource buffer 115. The reception time of a message may be time stamped in the data structure in the observed usage resource buffer 115 to determine whether the node transmitting the message is still considered "active" at a later time, so that only unique IDs from recently received messages are counted.

The frame receive buffer 102 may also receive a request from one of the devices 1, 2, 3, 4, 5, or 6, for release of wireless communication resources. In response, the apparatus may determine a threshold. The apparatus may determine the threshold based on an indication of a reservation limit, encoded into the request for release of wireless communication resources. The apparatus may compare an actual number of reserved wireless communication resources it has reserved with the threshold. The apparatus may release a portion of the actual number of wireless communication resources in response to the request, if the actual number is greater than the threshold, to enable the requesting node 1, 2, 3, 4, 5, or 6 to reserve additional wireless communication resources. The apparatus then waits for the reception of a release message or the expiry of a timer and then attempts to re-reserve additional wireless communication resources. The timer may be implemented on CPU 22.

The frame transmit buffer 104 is connected to the media access control (MAC) 36 to transmit messages requesting the release of wireless resources to other wireless devices 1, 2, 3, 4, 5, and 6. The apparatus determines an amount of available wireless communication resources, determines a number of wireless communication nodes and generates a reservation limit of the available wireless communication resources based on the determined number of wireless communication nodes and the determined amount of wireless communication resources. The apparatus may encode the reservation limit in a message requesting the release of wireless resources in its frame transmit buffer 104 and transmit the message to at least one of nodes 1, 2, 3, 4, 5, and 6 to enable allocation of additional wireless communication resources at the apparatus up to the reservation limit.

The RAM 24 and ROM 26 of FIG. 1 may be removable memory devices such as smart cards, Subscriber Identity Modules (SIMs), Wireless Application Protocol Identity Modules (WIMs), semiconductor memories such as a RAM, ROM, or PROM, flash memory devices, etc. The media access control (MAC) layer 36 of the network protocol of the wireless device and/or application program 30 may be embodied as program logic stored in the RAM 24 and/or PROM 26 in the form of sequences of programmed instructions which may be executed in the CPU 22, carry out the functions of the disclosed embodiments. The program logic may be delivered to the writeable RAM, ROM, PROM, flash memory device, etc. 24 of the apparatus from a computer program product or article of manufacture in the form of computer-usable media such as resident memory devices, smart cards or other removable memory devices, or in the form of program logic transmitted over any transmitting medium which transmits such a program. Alternately, the MAC Layer 36 and/or application program 30 may be embodied as integrated circuit logic in the form of programmed logic arrays or custom designed application specific integrated circuits (ASIC). The transceiver 38 in apparatus operates in accordance with the network protocol of the wireless device. The MAC layer 36 may operate using, for example the IEEE 802.11 standard, for example.

FIG. 2A shows an example stream of OFDM symbols on a time axis.

FIG. 2B shows an example group of subcarriers within a symbol, which defines a "radio resource", that may be allocated to a single transmitting node. Subsequent OFDM symbols can be arranged into a frame structure, forming a two-dimensional resource grid (symbol index and subcarrier block).

FIG. 2C shows an example embodiment of a wireless network environment with seven apparatuses. Two networks are formed by three nodes each, nodes 4, 5, and 6 in a first network and nodes 1, 2, and 3 in a second network. An observing node "O", located within transmission range of all other shown nodes, enters the environment. For example, it wakes up from sleep mode. It senses activity from every other radio. "Activity" on a radio resource indicates that the radio resource is in use, and the observing radio may not use it.

Figure 2D:
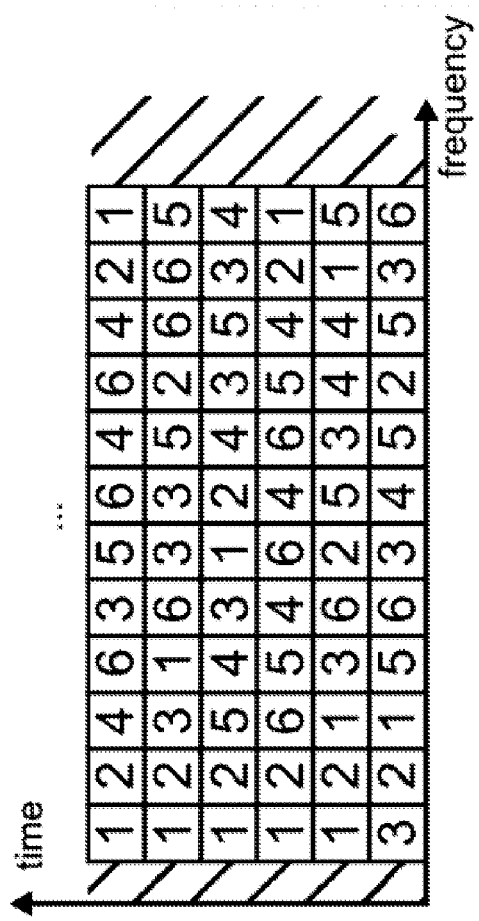
FIG. 2D illustrates an example of the identifier fields from received messages on radio resources providing the identity of the node transmitting the message.

FIG. 2D illustrates an example of the identifier fields from received messages on radio resources providing the identity of the node transmitting the message. The identifier may be an identifier that is unique to the node transmitting the message. A media access control (MAC) address is one example of an identifier. These ID values are buffered as a data structure in the observed usage resource buffer 115 of FIG. 1. Contents of buffer 115 result from sensing transmissions for some time at the observing node O. The observing node O processes the sensing result and counts the number $n_{sensed}$ of unique identifiers of transmitting nodes. For example, given the contents of buffer 115 shown in FIG. 2D, $n_{sensed}$ equals six (6). In one embodiment, node O may be a UE, capable of supporting a single connection at a time. Node O may determine an effective number of competing nodes as the number of sensed competing nodes plus one (1). In other words, node O may count itself as a competing node. The effective number of competing nodes $n_{eff}$ may be calculated as $$n_{eff} = n_{sensed} + 1.$$

It determines a fair share of radio resources by dividing the total number of available resources by the number of competing nodes, and rounds down, according to the equation:

$$n_{fair} = \max(1, \mathrm{floor}[n_{available}/n_{eff}]).$$

In another embodiment, node O may be an access point, serving a number of active UEs greater than one (1). Node O may determine an effective number of competing nodes $n_{eff}$ as the number of sensed competing nodes $n_{sensed}$ plus the number of served UEs, $n_{served}$. Further, the fair share of resources attributed to node O may scale with the number of served UEs. Thus, the effective number of competing nodes may be calculated as $$n_{eff} = n_{sensed} + n_{served}$$

and the fair share of radio resources may be determined according to the equation $$n_{fair} = \max(1, \mathrm{floor}[n_{served} * n_{available}/n_{eff}]).$$

FIG. 3 shows an example of 14 subsequent OFDM symbols that form a frame, containing 12 separate subcarrier groups. The total number of available resources is therefore $n_{available} = 168$.

Figure 4A:
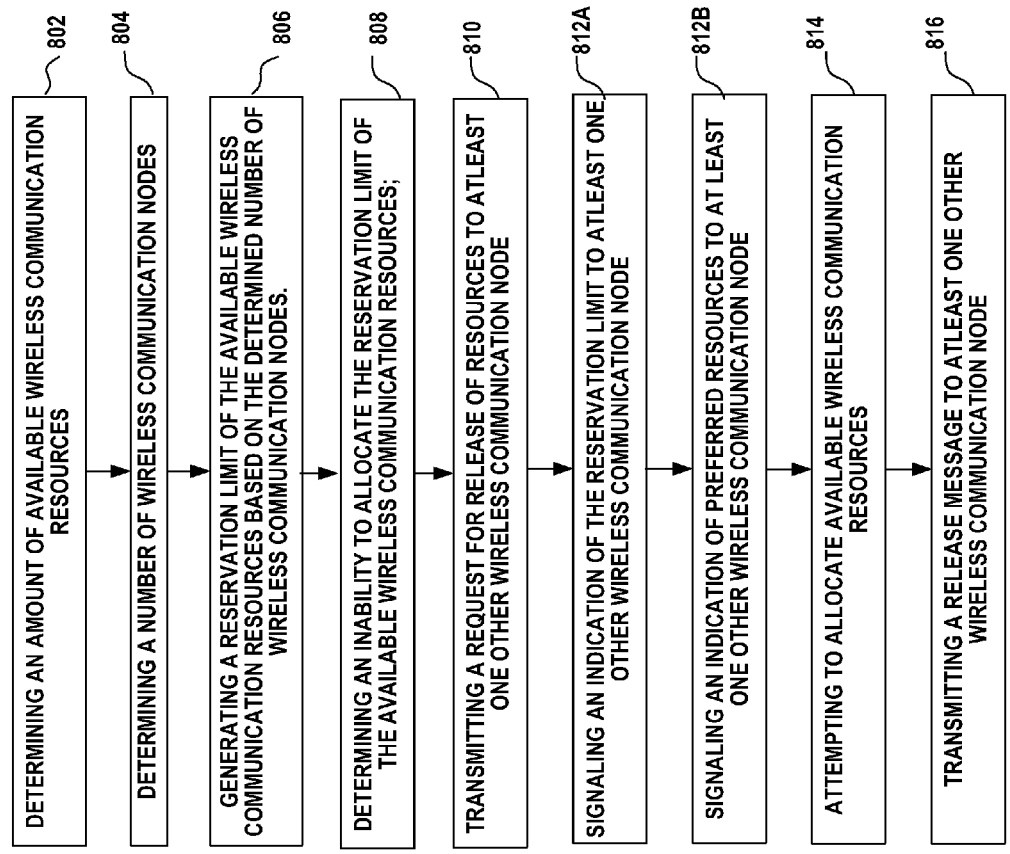
FIG. 4A illustrates an example flowchart of an embodiment, depicting the procedure carried out by a wireless apparatus node, including transmitting a request to wireless communication nodes for release of resources.

FIG. 4A illustrates an example flowchart of an embodiment, depicting a procedure carried out by an apparatus A1, including transmitting a request for release of resources to at least one other wireless communication node. Apparatus A1 may be the wireless node "O" in FIG. 2C. The procedure of the flow diagram of FIG. 4A may be embodied as program logic stored in the RAM 24 and/or ROM 26 of FIG. 1 in the form of sequences of programmed instructions which, when executed in the CPU 22, carry out the functions of an exemplary disclosed embodiment.

At step 802, apparatus A1 determines an amount of available wireless communication resources.

At step 804, apparatus A1 determines a number of wireless communication nodes.

At step 806, apparatus A1 generates a reservation limit of the available wireless communication resources, based on the determined number of wireless communication nodes.

At step 808, apparatus A1 determines an inability to allocate the reservation limit of the available communication resources.

At step 810, apparatus A1 transmits a request for the release of resources to at least one other wireless communication node.

At step 812A, apparatus A1 signals an indication of the reservation limit to at least one other wireless communication node. The indication of the reservation limit may be a function of the reservation limit. The indication of the reservation limit may quantize the reservation limit to a predetermined number of bits. The signaling of the indication of the reservation limit may be performed by the request for the release of resources. The indication of the reservation limit may be encoded into the message for the release of resources.

At step 812B, apparatus A1 signals an indication of preferred resources to at least one other wireless communication node.

At step 814, apparatus A1 attempts to allocate wireless communication resources.

At step 816, apparatus A1 transmits a release message to at least one other wireless communication node.

Figure 4B:
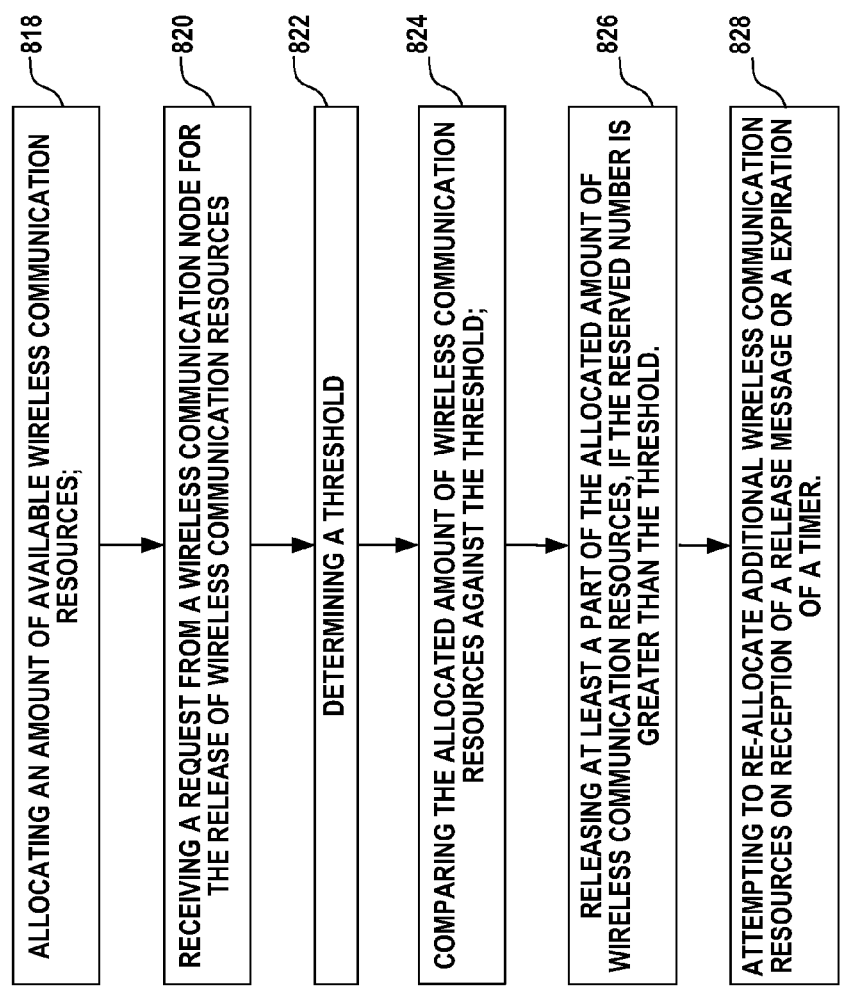
FIG. 4B illustrates an example flowchart of another embodiment, depicting the procedure carried out by the wireless apparatus node, releasing a portion of the actual number of wireless communication resources.

FIG. 4B illustrates an example flowchart of an embodiment, depicting a procedure carried out by an apparatus A2, including receiving a request from a wireless communication node for the release of wireless communication resources, determining a threshold, comparing a number of reserved wireless communication resources against the threshold and releasing a portion of the number of reserved wireless communication resources, if the number of reserved wireless communication resources is greater than the threshold. Apparatus A2 may be wireless node "2" in FIG. 2C.

The procedure in the flow diagram of FIG. 4B may be embodied as program logic stored in the RAM 24 and/or ROM 26 of FIG. 1 in the form of sequences of programmed instructions which, when executed in the CPU 22, carry out the functions of an exemplary disclosed embodiment.

In step 818, apparatus A2 allocates an amount of available wireless communication resources.

In step 820, apparatus A2 receives a request from a wireless communication node for the release of wireless communication resources.

In step 822, apparatus A2 determines a threshold. The threshold may indicate a fair share of radio resources. In one embodiment, the threshold may be determined based on a reservation limit decoded from the request for the release of communication resources. The threshold may be set equal to the reservation limit. In another embodiment, the threshold may be determined at least partly based on a determined number of available wireless communication resources and/or a determined number of competing wireless nodes. The threshold may be determined as a reservation limit, indicating a fair share of resources.

In step 824, apparatus A2 compares the allocated amount of wireless communication resources against the threshold. A number of wireless communication resources allocated by apparatus A2 exceeding the threshold may indicate to apparatus A2 that apparatus A2 currently allocates more than its fair share of resources.

In step 826, apparatus A2 releases at least a part of the allocated amount of wireless communication resources, if the reserved number is greater than the threshold. The number of released resources may be determined by taking a difference between the number of wireless communication resources and the threshold. Apparatus A2 may decide not to release any resources, if the number of wireless communication resources does not exceed the threshold.

In step 828, apparatus A2 attempts to re-allocate additional wireless communication resources on reception of a release message or an expiration of a timer. On reception of the release message, apparatus A2 may attempt to re-allocate wireless resources. Further, apparatus A2 may attempt to re-allocate wireless resources on expiry of a timer. The timer may have been started on receiving the request for the release of resources in step 820, or at a later time.

Figure 4C:
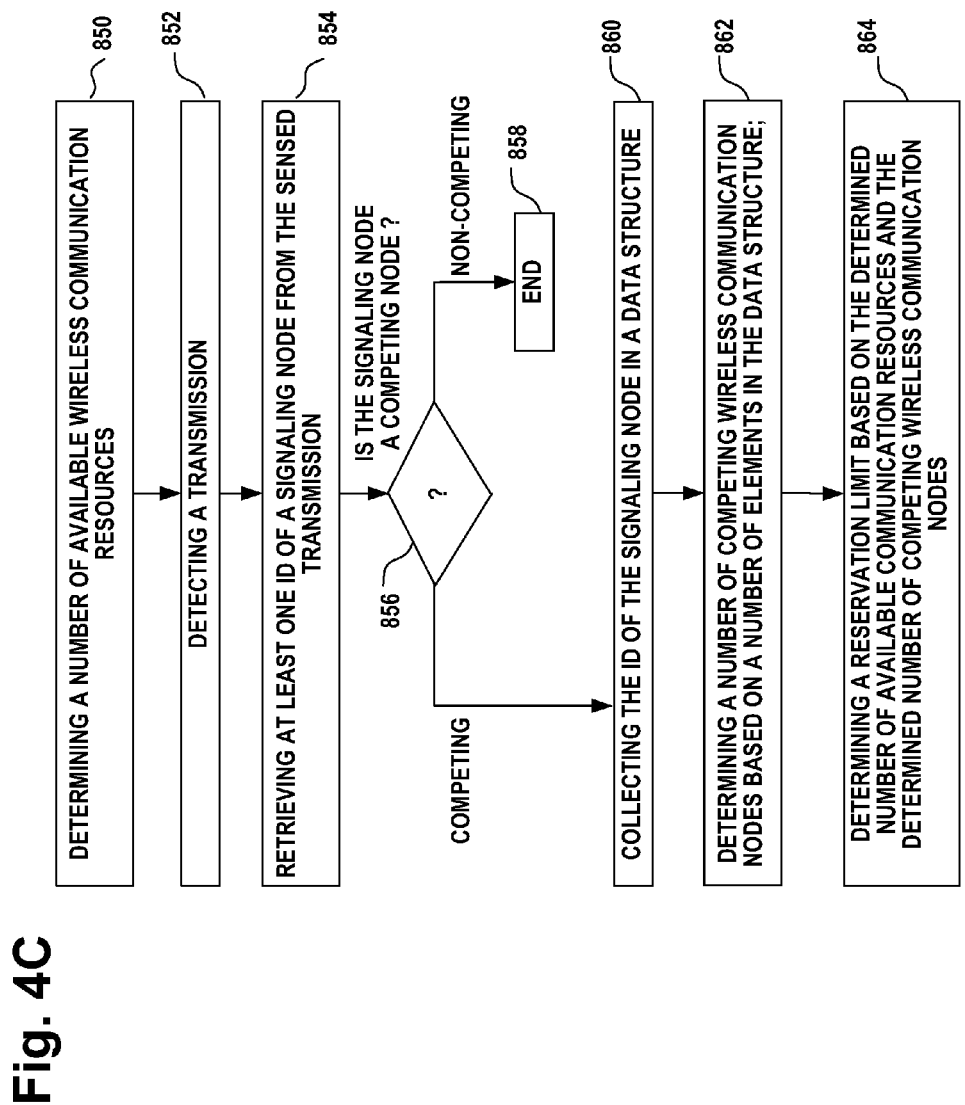
FIG. 4C illustrates an example flowchart of another embodiment, depicting the procedure carried out by a wireless apparatus node, including collecting into a data structure the identifier of a signaling node if the signaling node has been identified as a competing node.

FIG. 4C illustrates an example flowchart of another embodiment, depicting the procedure carried out by the apparatus A1 or the apparatus A2, referred to as "wireless apparatus node B", including sensing or detecting a transmission from a competing node, determining the identity of a signaling node from the transmission and determining a count of unique identities of signaling nodes determined from transmissions during a time window. The procedure of the flow diagram of FIG. 4C may be embodied as program logic stored in the RAM 24 and/or ROM 26 of FIG. 1 in the form of sequences of programmed instructions which, when executed in the CPU 22, carry out the functions of an exemplary disclosed embodiment.

In step 850, wireless apparatus node B determines an amount of available wireless communication resources.

In step 852, wireless apparatus node B senses a transmission. The transmission may be an arbitrary message, for example a RTS message, a CTS message, an ACK message or a DATA message. The transmission may encode one or more IDs. An ID may be a code identifying a node. Further, an ID may provide the relation of the identified node to the message. For example, the ID may identify the node sending the message, one or more intended recipient nodes for the message, or a node relaying the message.

In step 854, wireless apparatus node B retrieves at least one ID of a signaling node from the transmission. Wireless apparatus node B may be configured to select IDs with a predetermined relation of the identified node to the message as IDs of signaling nodes. Wireless apparatus node B may be configured to select the sending node of a message as a signaling node.

In step 856, wireless apparatus node B classifies the signaling node as a competing node. A competing node may be a node that is not under the control of the same coordinating node as wireless apparatus node B. A coordinating node may be an access point node comprising a scheduler. A signaling node may be classified as a competing node, when neither the ID of a node transmitting the message node nor the ID of a node receiving the message are found in a list of known nodes. The list of known nodes may contain IDs of neighboring nodes belonging to the same network with wireless apparatus node B. The list of known nodes may identify an access point node comprising a scheduler.

In step 858, wireless apparatus node B has classified the signaling node as a non-competing node, and the process ends.

In step 860, wireless apparatus node B has classified the signaling node as a competing node and inserts the ID of the signaling node into a data structure. The data structure may be a hash table, entering the ID of the signaling node as a unique key and a time stamp as a value.

In step 862, wireless apparatus node B determines a number of competing wireless communication nodes based on a number of elements in a data structure. Determining a number of competing wireless communication nodes may comprise counting the number of elements in a data structure. Counting the number of elements in a data structure may comprise selecting only those entries, where the time stamp of the entry indicates that it has been updated in a time window, relative to current time. The time window may have predetermined length. The length of the time window may depend on a determined number of neighboring nodes. Wireless apparatus node B may count itself as one competing node. Wireless apparatus node B may count other known neighboring nodes belonging to the same network with wireless apparatus node B as competing nodes. Counted other known neighboring nodes may comprise nodes served by wireless apparatus node B.

In step 864, wireless apparatus node B determines a reservation limit based on the determined number of wireless communication resources and the determined number of competing wireless communication nodes. Determining the reservation limit may comprise calculating a quotient of the determined number of wireless communication resources and the determined number of competing wireless devices. Determining the reservation limit may further comprise multiplying the quotient with a number of known neighboring nodes belonging to the same network that are served by wireless apparatus node B.

Figure 5:
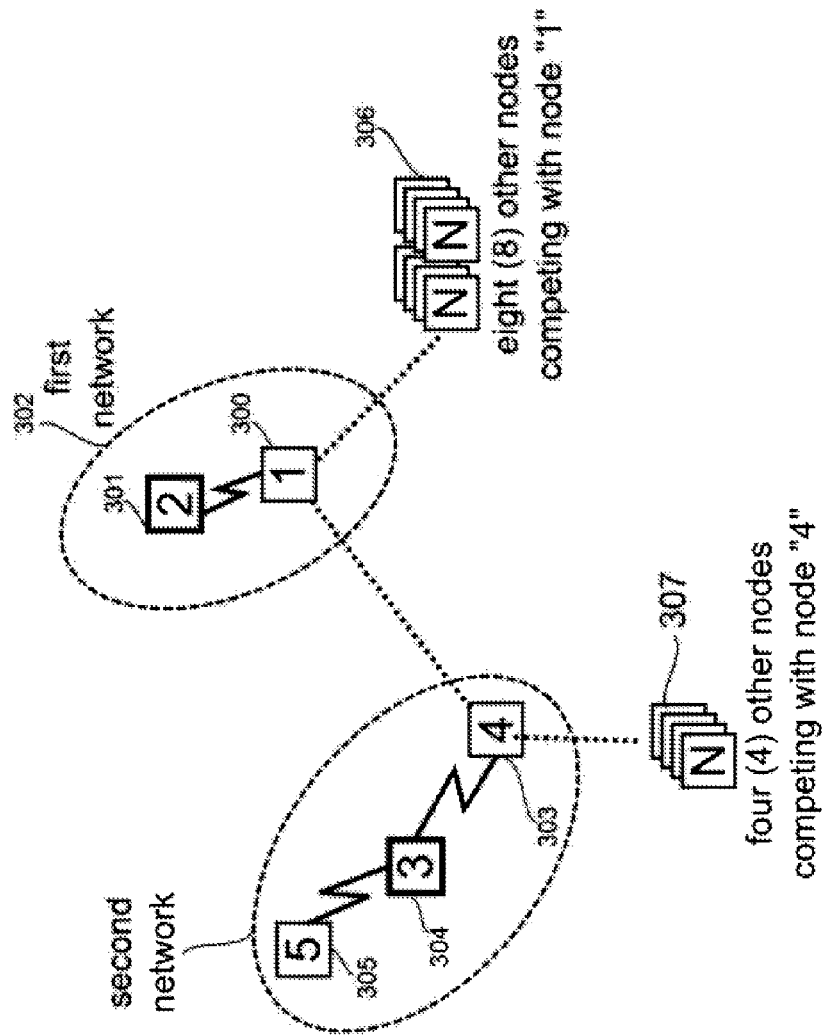
FIG. 5 illustrates an example embodiment of a network, where wireless communication nodes compete for radio resources.

FIG. 5 illustrates an example embodiment of a network, where two wireless communication nodes compete for radio resources. Wireless communication nodes 300, 301, 303, 304 and 305 operate in a radio environment. Nodes 300 and 301 form a first radio network. Nodes 303, 304 and 305 form a second radio network. Resulting from propagation effects in the radio environment, a transmission from node 300 may cause intolerable interference at node 303 and vice versa. Therefore, nodes 300 and 303 must compete for resources. Node 300 may acquire reservations on radio resources, preventing node 303 from transmitting and thus causing interference.

Node 300 intends to allocate more radio resources to exchange data with node 301. Node 300 is unable to allocate more resources, but potentially available resources are allocated and thus reserved by node 303.

Node 300 is further competing with eight (8) other nodes 306, belonging to different networks.

Node 303 is further competing with four (4) other nodes 307, also belonging to different networks.

Node 300 determines a number of available radio resources $a_{300}$. The number may be fixed, or it may depend on external input such as for example resource reservations of coexisting primary systems such as digital TV stations or wireless microphones. $a_{300}$ may be one hundred and sixty-eight (168).

Node 300 determines a number of wireless communication nodes $n_{300}$. The number of wireless communication nodes may be limited to only count competing nodes. $n_{300}$ may be determined by counting competing nodes in the vicinity of node 300. The count may include eight (8) competing nodes 306 and node 303. The count may further include itself (node 300). Node 301 may be omitted as a non-competing node, because it belongs to the same wireless network as node 300, and both nodes may be able to use existing control links to manage access to shared radio resources. The number of competing nodes $n_{300}$ may be ten (10) in this example.

Node 300 generates a reservation limit $R_{300}$. It may divide the total number of available resources by the number of competing nodes, and rounds down. Thus, R=floor(168/10)=16.

Node 300 determines its number of allocated radio resources $b_{300}$. Node 300 determines that the number of allocated radio resources $b_{300}$ is smaller than the reservation limit $R_{300}$. Node 300 further determines that it is unable to allocate more radio resources to reach the reservation limit $R_{300}$, because radio resources are allocated by competing nodes.

Node 300 transmits a request for the release of resources to at least one competing node. The request may be encoded as a request message. The request message may be addressed to a single recipient node or a set of recipient nodes or the request message may be transmitted as a broadcast message. The request message may comprise indication to address the message to all nodes not belonging to the first network 302.

The request message may include an indication of a reservation limit. The indication of a reservation limit may comprise one or more of: the count $n_{300}$, reservation limit $R_{300}$, the number of available resources $a_{300}$ and/or any function thereof.

The request message may further comprise an indication of preferred resources for release. The indication of preferred resources for release may comprise a list of resources. The list of resources may comprise one or more indices, each identifying one particular resource. The list of resources may comprise one or more intervals of indices, each identifying a range of resources. The indication of preferred resource may assign a priority to elements in the list of resources. The priority may be assigned by the order of elements in the list of resources.

Node 303 receives a request message for the release of resources. The request message may be the request for the release of resources transmitted by node 300.

Further, node 303 may receive an indication of a reservation limit. The indication of a reservation limit may be embedded into the request message from node 300. The indication of a reservation limit may comprise reservation limit $R_{300}$, the number of available resources $a_{300}$ and/or any function thereof.

Node 303 determines a threshold for resource allocation. The threshold may be based at least partly on: the received indication of a reservation limit; a number of available communication resources at node 303; a number of nodes determined by node 303 and/or a reservation limit $R_{303}$ determined by node 303.

The threshold may be set equal to reservation limit $R_{300}$ or to reservation limit $R_{303}$.

Node 303 compares its number of allocated resources against the threshold.

Node 303 determines that its number of allocated resources exceeds the threshold, and as a consequence releases allocated resources. The resources selected for release may be based at least in part of an indication of preferred resources for release from the received request message. Node 303 may obtain a list of resources from the received request message. Node 303 may release allocated resources in an order provided by the list of resources.

Node 300 may transmit a request for the release of resources also to other competing nodes. A request message transmitted to another competing node may be the same request message that was received by node 300. The request message received by another competing node may be a different request message than the request message that was received by node 300.

Other competing nodes may respond to the request in a similar manner as node 303 and release resources, so that the number of allocated resources does not exceed a threshold.

Node 300 renews its attempt to allocate resources. Since node 303 and competing nodes 306 have temporarily released resources, it may now be able to allocate more resources than it would have been before transmitting the request for the release of resources. Node 300 may temporarily limit the number of allocated resources to the reservation limit $R_{300}$.

Node 300 may transmit one or more release messages. A release message may be addressed to one recipient node, to a group of recipient nodes or all nodes able to receive the release message. A release message may identify an earlier message requesting the release of resources.

On reception of a release message, node 306 may allocate additional wireless communication resources. Node 306 may attempt to re-allocate resources that it released on reception of the message for the release of resources. Re-reservation may also be triggered by the expiry of a timer. The timer interval may be predetermined. The timer may be started by reception of the request message. The timer may be started by the temporary release of resources.

Figure 6A:
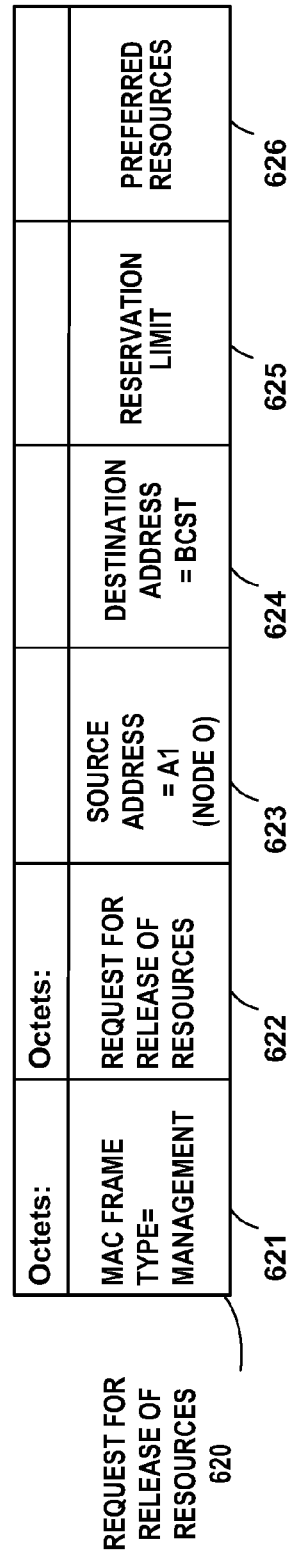
FIG. 6A depicts an example request for release of resources as a management MAC frame sent by the requesting apparatus as a broadcast to all other neighboring nodes.

FIG. 6A depicts an example request for release of resources 620 as a management MAC frame may be sent by the requesting device A1 (Node O in FIG. 2C) as a broadcast to all other neighboring nodes. The frame 620 includes an indication of the reservation limit 625 that may comprise one or more of: the count $n_{300}$, reservation limit $R_{300}$, the number of available resources $a_{300}$ and/or any function thereof. The frame 620 may include also an indication of preferred resources for release 626. The indication of preferred resources for release may comprise a list of resources, for example one or more indices, each identifying one particular resource. The example list of resources may comprise one or more intervals of indices, each identifying a range of resources. The indication of preferred resources may assign a priority to elements in the list of resources. The priority may be assigned by the order of elements in the list of resources.

The indication of preferred resources may comprise one or more bit-field vectors, each bit corresponding to one radio resource.

FIG. 6B depicts an example release message 630 as a management MAC frame may be sent by the requesting device A1 (Node O in FIG. 2C) as a broadcast to all other neighboring nodes. The frame 630 may identify in field 635 a reference to an earlier message 620 requesting the release of resources.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes may be made to the specific example embodiments without departing from the spirit and scope of the invention.

What is claimed is:

1. A method comprising:
   determining an amount of available wireless communication resources in a reception area;
   determining a number of wireless communication nodes in the reception area;
   generating a reservation limit of the available wireless communication resources;
   determining an inability to allocate the reservation limit of the available wireless communication resources;
   transmitting a request for release of resources to at least one other wireless communication node, the request for release including an indication of the reservation limit;
   attempting to allocate available wireless communication resources, resources that have been released by at least one other wireless node based on the reservation limit, and temporarily limiting the number of allocated resources to the reservation limit; and
   transmitting a release message to the at least one other wireless communication node, to enable at least one other wireless communication node to attempt to re-allocate resources that it released in response to the request for release of resources.

2. The method of claim 1, further comprising:
   signaling an indication of the reservation limit to at least one other wireless communication node.

3. The method of claim 1, further comprising:
   signaling an indication of preferred resources to at least one other wireless communication node.

4. The method of claim 1, wherein the determining a number of wireless communication nodes comprising:
   determining a number of competing wireless communication nodes.

5. The method of claim 1, wherein the determining a number of wireless communication nodes comprising:
   detecting a transmission from at least one wireless communication node;
   determining an identity of the at least one wireless communication node based on the detected transmission; and
   determining a count of unique identities during a time window based on the identity of the at least one wireless communication node.

6. A method comprising:
   allocating an amount of available wireless communication resources;
   receiving a request from a wireless communication node to release wireless communication resources, the request for release including an indication of a reservation limit requested by the wireless communication node;
   determining a threshold based on the reservation limit;
   comparing the allocated amount of wireless communication resources against the threshold;
   releasing at least a part of the allocated amount of wireless communication resources, if a reserved number is greater than the threshold; and
   attempting to re-allocate additional wireless communication resources on reception of a release message or an expiration of a timer from the wireless communication node, which were released in response to the request for release of resources, the re-allocated additional resources being in excess of the reservation limit requested by the wireless communication node.

7. The method of claim 6, further comprising:
   receiving an indication of a reservation limit and determining the threshold based on the received indication of a reservation limit.

8. The method of claim 6, further comprising:
   said available wireless communication resources being drawn from the group consisting of an available number of time domain multiple access (TDMA) time slots, an available number of different frequency domain multiple access (FDMA) frequency bands, an available number of different orthogonal frequency division multiple access (OFDMA) time slots in different sub-carrier frequencies, and an available number of different code division multiple access (CDMA) orthogonal codes.

9. An apparatus, comprising:
   at least one processor;
   at least one memory including computer program code;
   wherein the at least one memory further comprises computer program code, the at least one memory and the computer program code configured to, with the at least one processor, cause the apparatus at least to:
   determine an amount of available wireless communication resources in a reception area;
   determine a number of wireless communication nodes in the reception area;
   generate a reservation limit of the available wireless communication resources;
   determine an inability to allocate the reservation limit of the available wireless communication resources;

transmit a request for release of resources to at least one other wireless communication node, the request for release including an indication of the reservation limit;

attempt to allocate available wireless communication resources, resources that have been released by at least one other wireless node based on the reservation limit, and temporarily limiting the number of allocated resources to the reservation limit; and transmit a release message to the at least one other wireless communication nod; to enable at least one other wireless communication node to attempt to re-allocate resources that it released in response to the request for release of resources.

10. The apparatus of claim 9, wherein the at least one memory further comprises computer program code, the at least one memory and the computer program code configured to, with the at least one processor, cause the apparatus at least to:

signal an indication of the reservation limit to at least one other wireless communication node.

11. The apparatus of claim 9, wherein the at least one memory further comprises computer program code, the at least one memory and the computer program code configured to, with the at least one processor, cause the apparatus at least to:

signal an indication of preferred resources to at least one other wireless communication node.

12. The apparatus of claim 9, wherein the at least one memory further comprises computer program code, the at least one memory and the computer program code configured to, with the at least one processor, cause the apparatus at least to:

determine a number of competing wireless communication nodes.

13. The apparatus of claim 9, wherein the at least one memory further comprises computer program code, the at least one memory and the computer program code configured to, with the at least one processor, cause the apparatus at least to:

detect a transmission from at least one wireless communication node;

determine an identity of the at least one wireless communication node based on the detected transmission; and determine a count of unique identities during a time window based on the identity of the at least one wireless communication node.

14. An apparatus, comprising:
at least one processor;
at least one memory including computer program code;
wherein the at least one memory further comprises computer program code, the at least one memory and the computer program code configured to, with the at least one processor, cause the apparatus at least to:
allocate an amount of available wireless communication resources;
receive a request from a wireless communication node to release wireless communication resources, the request for release including an indication of a reservation limit requested by the wireless communication node;
determine a threshold based on the reservation limit;
compare the allocated amount of wireless communication resources against the threshold;
release at least a part of the allocated amount of wireless communication resources, if a reserved number is greater than the threshold; and
attempt to re-allocate additional wireless communication resources on reception of a release message or an expiration of a timer from the wireless communication node, which were released in response to the request for release of resources, the re-allocated additional resources being in excess of the reservation limit requested by the wireless communication node.

15. The apparatus of claim 14, wherein the at least one memory further comprises computer program code, the at least one memory and the computer program code configured to, with the at least one processor, cause the apparatus at least to:

receive an indication of a reservation limit and
determine the threshold based on the received indication of a reservation limit.

16. The apparatus of claim 14, wherein said available wireless communication resources being drawn from the group consisting of an available number of time domain multiple access (TDMA) time slots, an available number of different frequency domain multiple access (FDMA) frequency bands, an available number of different orthogonal frequency division multiple access (OFDMA) time slots in different subcarrier frequencies, and an available number of different code division multiple access (CDMA) orthogonal codes.

17. A computer readable non-transitory medium storing program instructions, which when executed by a computer processor, perform the steps of:

determining an amount of available wireless communication resources in a reception area;

determining a number of wireless communication nodes in the reception area;

generating a reservation limit of the available wireless communication resources;

determining an inability to allocate the reservation limit of the available wireless communication resources;

transmitting a request for release of resources to at least one other wireless communication node, the request for release including an indication of the reservation limit;

attempting to allocate available wireless communication resources, resources that have been released by at least one other wireless node based on the reservation limit, and temporarily limiting the number of allocated resources to the reservation limit; and transmitting a release message to the at least one other wireless communication node, to enable at least one other wireless communication node to attempt to re-allocate resources that it released in response to the request for release of resources.

18. A computer readable non-transitory medium storing program instructions, which when executed by a computer processor, perform the steps of:

allocating an amount of available wireless communication resources;

receiving a request from a wireless communication node to release wireless communication resources, the request for release including an indication of a reservation limit requested by the wireless communication node;

determining a threshold based on the reservation limit;

comparing the allocated amount of wireless communication resources against the threshold;

releasing at least a part of the allocated amount of wireless communication resources, if a reserved number is greater than the threshold; and attempting to re-allocate additional wireless communication resources on reception of a release message or an expiration of a timer from the wireless communication node, which were released in response to the request for release of resources, the re-allocated additional resources being in excess of the reservation limit requested by the wireless communication node.

19. An apparatus, comprising:

means for determining an amount of available wireless communication resources in a reception area;

means for determining a number of wireless communication nodes in the reception area;

means for generating a reservation limit of the available wireless communication resources;

means for determining an inability to allocate the reservation limit of the available wireless communication resources;

means for transmitting a request for release of resources to at least one other wireless communication node, the request for release including an indication of the reservation limit;

means for attempting to allocate available wireless communication resources, resources that have been released by at least one other wireless node based on the reservation limit, and temporarily limiting the number of allocated resources to the reservation limit; and means for transmitting a release message to the at least one other wireless communication node, to enable at least one other wireless communication node to attempt to re-allocate resources that it released in response to the request for release of resources.

* * * * *